(12) United States Patent
Hallett et al.

(10) Patent No.: US 7,814,084 B2
(45) Date of Patent: Oct. 12, 2010

(54) CONTACT INFORMATION CAPTURE AND LINK REDIRECTION

(75) Inventors: Paul Hallett, Beijing (CN); Fernando Martins, Beijing (CN); Calvin Li, Beijing (CN); Ning Li, Beijing (CN)

(73) Assignee: Schmap Inc., Carrboro, NC (US)

( * ) Notice: Subject to any disclaimer, the term of this patent is extended or adjusted under 35 U.S.C. 154(b) by 401 days.

(21) Appl. No.: 12/052,651

(22) Filed: Mar. 20, 2008

(65) Prior Publication Data

US 2008/0243793 A1    Oct. 2, 2008

Related U.S. Application Data

(60) Provisional application No. 60/895,999, filed on Mar. 21, 2007, provisional application No. 60/896,004, filed on Mar. 21, 2007.

(51) Int. Cl.
*G06F 17/30* (2006.01)
(52) U.S. Cl. ........................ 707/706; 707/802
(58) Field of Classification Search .............. 707/706, 707/802
See application file for complete search history.

(56) References Cited

U.S. PATENT DOCUMENTS

| 5,652,882 A * | 7/1997 | Doktor ........................ 707/802 |
| 6,035,297 A * | 3/2000 | Van Huben et al. .......... 707/695 |
| 6,480,850 B1 * | 11/2002 | Veldhuisen ................... 707/610 |
| 6,557,004 B1 * | 4/2003 | Ben-Shachar et al. ........ 707/706 |
| 6,574,635 B2 * | 6/2003 | Stauber et al. ............... 707/704 |
| 6,671,681 B1 * | 12/2003 | Emens et al. ................ 707/706 |
| 6,694,307 B2 * | 2/2004 | Julien ........................... 707/706 |
| 6,697,821 B2 * | 2/2004 | Ziff et al. ..................... 707/706 |
| 6,732,092 B2 * | 5/2004 | Lucas et al. .................. 707/706 |
| 6,836,768 B1 * | 12/2004 | Hirsch .......................... 715/225 |
| 7,058,625 B2 * | 6/2006 | Bossemeyer et al. ........ 707/706 |
| 7,103,589 B1 * | 9/2006 | Kepler et al. ................ 707/706 |
| 7,146,370 B1 * | 12/2006 | Klindt et al. ................ 707/773 |

* cited by examiner

*Primary Examiner*—Don Wong
*Assistant Examiner*—Kim T Nguyen
(74) *Attorney, Agent, or Firm*—Coats & Bennett, P.L.L.C.

(57) ABSTRACT

A contact information function associated with a web browser maintains a look-up table of recognizer functions, indexed by regular expressions that specify URLs. Upon a user entering or selecting a URL, the contact information function indexes the look-up table with the URL against the regular expressions. If one or more recognizers are found, the web content returned from the URL is processed by each of the recognizers, which recognize the format of information on that web site, and locate and extract contact information from the web content. The contact information may be saved, formatted, and output to other applications. Updated recognizers may be downloaded from a recognizer server.

17 Claims, 15 Drawing Sheets

CONTACT INFORMATION CAPTURE AND LINK REDIRECTION

This application claims priority to U.S. Provisional Patent Application Ser. No. 60/895,999, titled "Method and Apparatus for Recognizing and Capturing Contact Information From a Web Page," filed Mar. 21, 2007, and U.S. Provisional Patent Application Ser. No. 60/896,004, titled "Method and Apparatus for Remote Redirection of Interactive Place Links in a Client Side Mapping Application," filed Mar. 21, 2007, both of which are incorporated herein by reference in their entirety.

FIELD OF THE INVENTION

The present invention relates generally to internet web browsers, and in particular to functionality associated with a browser for extracting contact information from a variety of web sites.

BACKGROUND

Many web sites available on the Internet allow searches for entities such as people, businesses, and other organizations. For example, a person at a web browser may connect to a web service such as Google Maps®, enter a query such as "pizza in Livingston, Mont.," and receive a list of pizza parlors along with an address, phone number, and a Uniform Resource Locator (URL) for each restaurant.

This contact information is very useful, but hard to take away from the web browser. The user can copy it by hand to paper, which can take a long time, or print the full web page, which often fills the printed page with extraneous information. The user can select the contact information in the web page to copy and paste the information in another application for easier handling. The application may be an address book such as Microsoft Outlook® or even a simple word processor where the user can edit and print the information. Pasting has its own problems, though, because contact information on a web page is typically encoded in HTML, XML, or other markup language, and formatted in ways that cause copied text to be arranged poorly or to look bad when pasted into another application. The contact information may not be perceived as such by the receiving application.

One solution for easily moving contact information from a web page to another application is a plug-in for the web browser that recognizes contact information in a web page and captures it in a simple-to-use format that does not include the HTML formatting and any non-standard arrangements the web page uses. Once captured, the extension can easily arrange and format that contact information for export into other applications where the applications can easily use it.

Recognizing and capturing contact information within a web page is not easy for many of the same reasons it is hard to cut and paste that information: it is embedded in HTML code, often using widely varying techniques from web site to web site. Contact information is also arranged in many different ways depending on web site standards, local customs, and more. Creating a single computer process designed to recognize contact information in all these different settings is a formidable challenge in artificial intelligence.

In addition to contact information, users often desire information related to locations discovered or examined on a map. An interactive map (i.e., one in which the user may zoom and pan to selectively control the displayed location) is a good way to find new places of interest: neighborhood restaurants, stores, parks, schools, and more. Once a user has found a place of interest, he quite often wants more information about that place.

A web browser connected through the Internet to $3^{rd}$-party web services provides a powerful resource for information about places. A user can find, for example, reviews of a restaurant, the address of a business, driving instructions to a park, pictures of a school, a place to make on-line reservations for a hotel, and much more.

It can take considerable work, though, to gather that information. The user must know what $3^{rd}$-party services exist to provide the information and have a link or Universal Resource Locator (URL) to those services. He must also know how to provide correct search information to those services for meaningful results. Even a knowledgeable web user may take a considerable amount of time to gather useful information about a place on a map.

An interactive map hosted on a web site may be able to provide some help with place information. When a user selects a place on the map, it can provide links to information about that place. Those links provide the URLs for appropriate services and insert correctly formatted place-specific search info in the URL for meaningful results. Server-side interactive maps like this have drawbacks, though: they are often slow in response because map data has to constantly download to the user's computer.

An interactive map self-contained on the user's computer (a client-side interactive map) stores all map data on the computer and does not suffer the slow map presentation drawbacks of server-side interactive maps. They can, like server-side maps, provide links for additional information about selected places on a map. Because the map data is resident on the user's computer, though, those links cannot be constantly updated to ensure that they point to an active service or the best service and that they follow the services' current requirements for search information formatting. For example, a map on a user's computer may have links that point to a service that has gone out of business that point to a service's no-longer-valid URL, or that present street address search information in a format that a service no longer recognizes.

SUMMARY OF THE INVENTION

According to one or more embodiments disclosed and claimed herein, a contact information function associated with a web browser maintains a look-up table of recognizer functions, indexed by regular expressions that specify URLs. Upon a user entering or selecting a URL, the contact information function indexes the look-a table with the URL against the regular expressions. If one or more recognizers are found, the Web content returned from the URL is processed by each of the recognizers, which extract contact information from the Web content. The contact information may be formatted and output to other applications. Updated recognizers may be downloaded from a recognizer server.

According to one embodiment, a redirection engine on a link server redirects URLs to $3^{rd}$-party information servers. Upon a user entering or selecting a link associated with a place on a local interactive map, a redirection URL is generated, addressing the link server and including a link interpret code and other information. A redirection engine on the link server generates a redirected URL to a $3^{rd}$-party information server based on the link interpret code and information in the redirection URL. The $3^{rd}$-party information server sends information to the user. Contact information may be extracted from the 3$^{rd}$-party information by the contact information function.

DETAILED DESCRIPTION OF THE INVENTION

Figure 1:
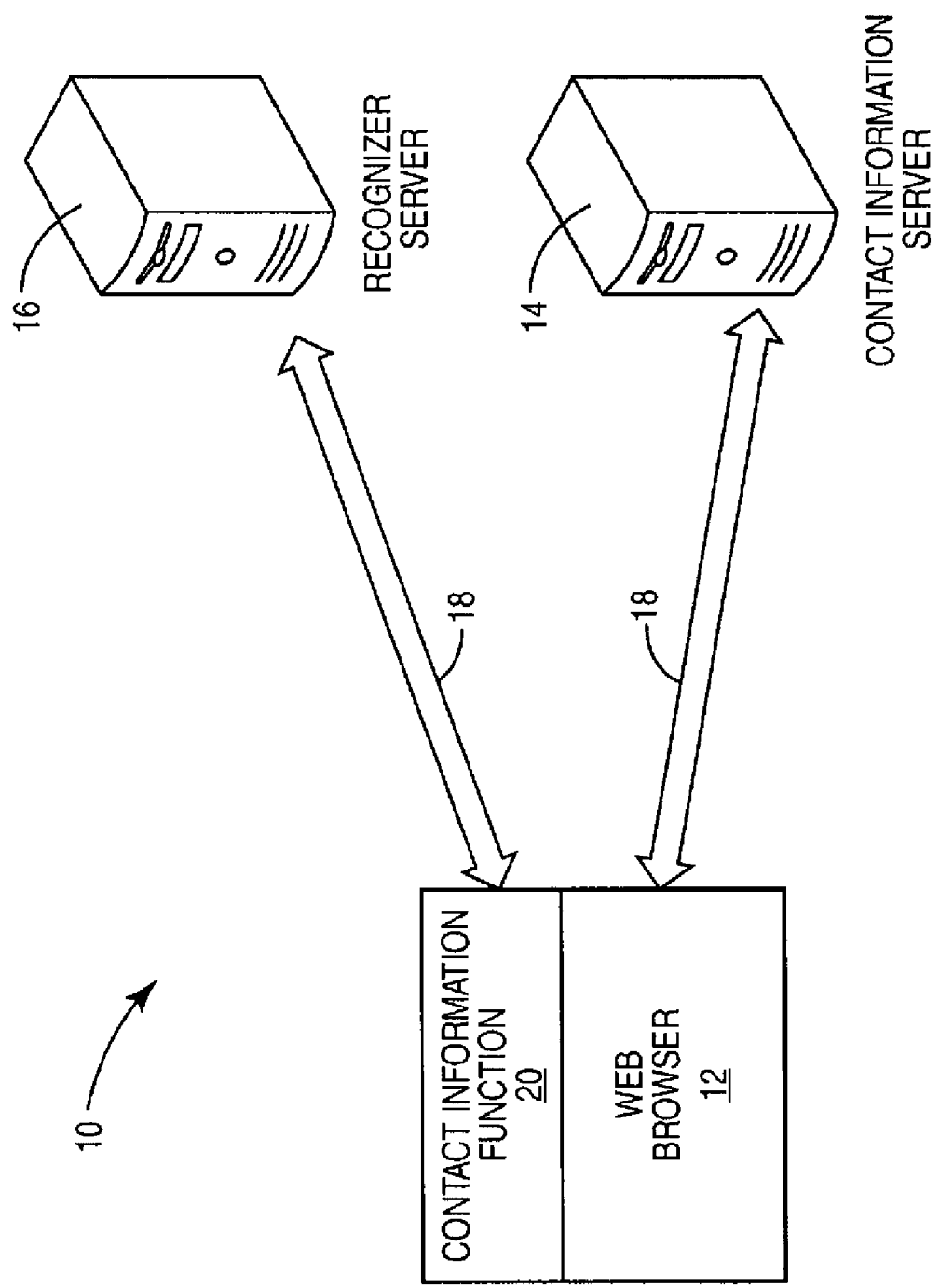
FIG. 1 is a functional block diagram of a web browser connected to servers.

FIG. 1 illustrates a system 10 of a web browser 12 and servers 14, 16 that may be operated in accordance with an embodiment of the invention. The web browser 12 is a standard browser such as Mozilla Firefox® or Microsoft Explorer®. The web browser 12 is in contact via standard Internet connections 18 or any other types of connections to one or more contact information servers 14 such as, e.g., Google Maps® or MapQuest®.

A contact information function 20 operates with the web browser 12 to recognize and extract contact information from visited web sites. In one embodiment, the contact information function 20 is implemented as a plug-in that is written using the browser's 12 API to reside as a plug-in, extension, or other browser augmentation within the browser 12. The plug-in runs when the web browser 12 runs. In another embodiment, the contact information function 20 may be incorporated directly into the web browser 12. In one embodiment, the contact information function 20 occasionally connects via Internet or other connections 18 to a recognizer server 16 from which the contact information function 20 retrieves new recognizers or updated recognizers when they exist.

Figure 2:
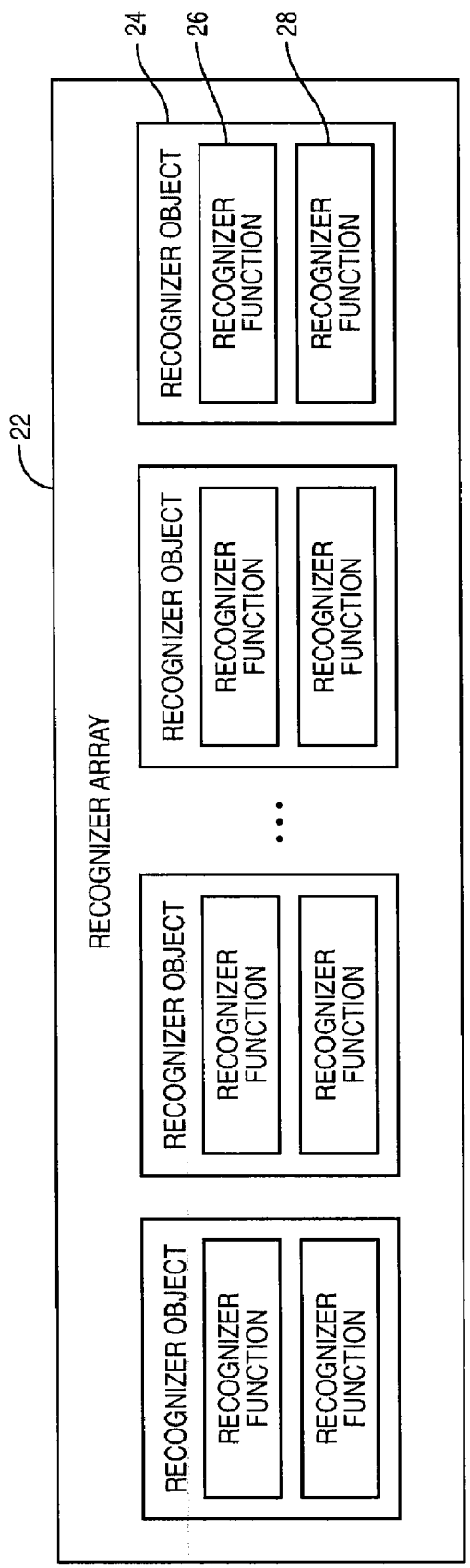
FIG. 2 is a block diagram of a recognizer array data structure.

FIG. 2 illustrates a recognizer array 22 that an embodiment stores in a file, then later loads into memory. The array 22 contains a set of recognizer objects 24 that each implement two functions: a recognize function 26 that contains an algorithm used to search for contact information; and a registration function 28 that registers the recognizer with the contact information function 20 and supplies a regular expression that specifies the URLs within which the recognizer 24 is designed to work.

Figure 3:
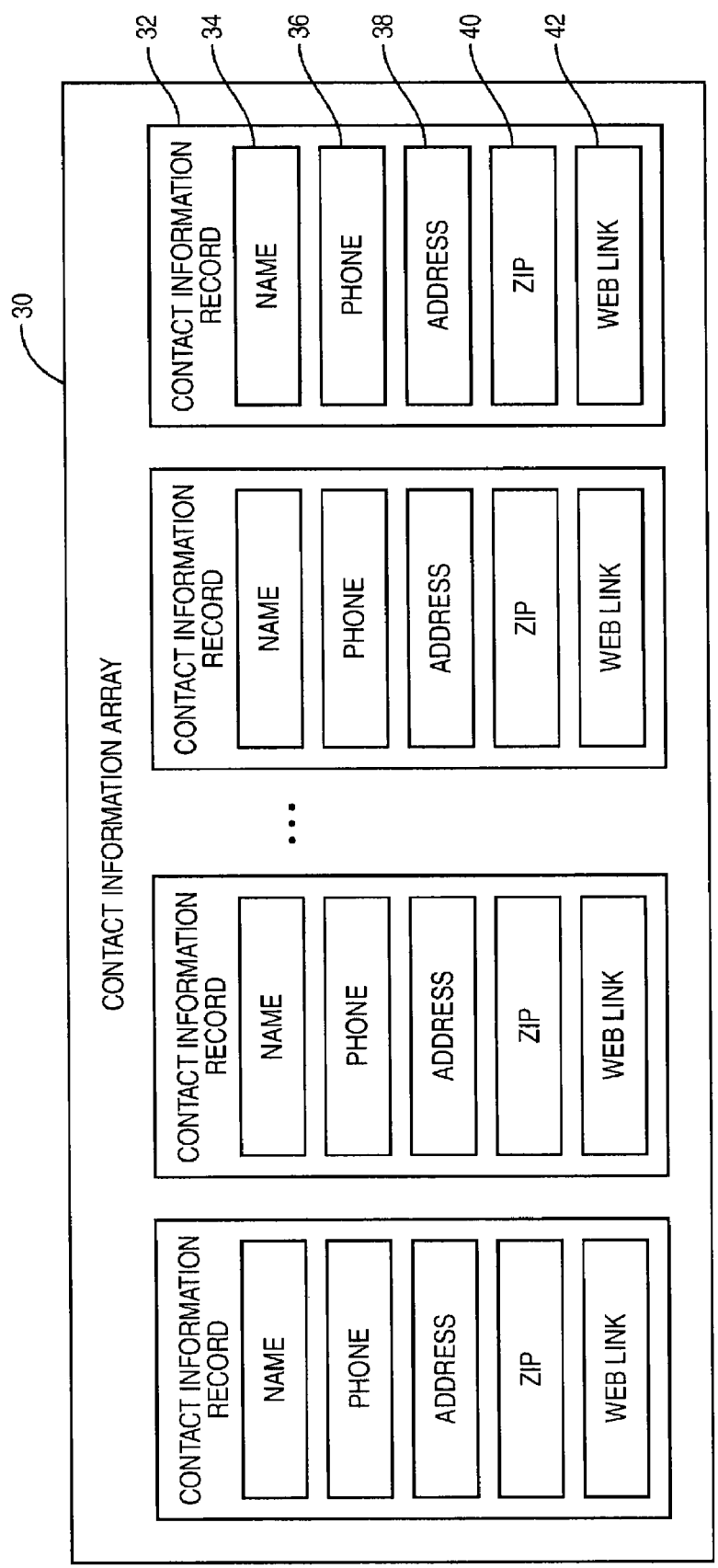
FIG. 3 is a block diagram of a contact information array data structure.

FIG. 3 illustrates a contact information array 30 that a recognizer 24 returns after it searches web content for contact information. If the search returns no contact information, the array 30 is empty. If the search returns contact information, the recognizer 24 arranges it as one or more contact information records 32 in the array 30. In one embodiment, each contact information record 32 is formatted in a simple text format with a set of standard fields that include but are not limited to name 34, phone number 36, street address and city 38, postal code 40, and URL 40.

Figure 4:
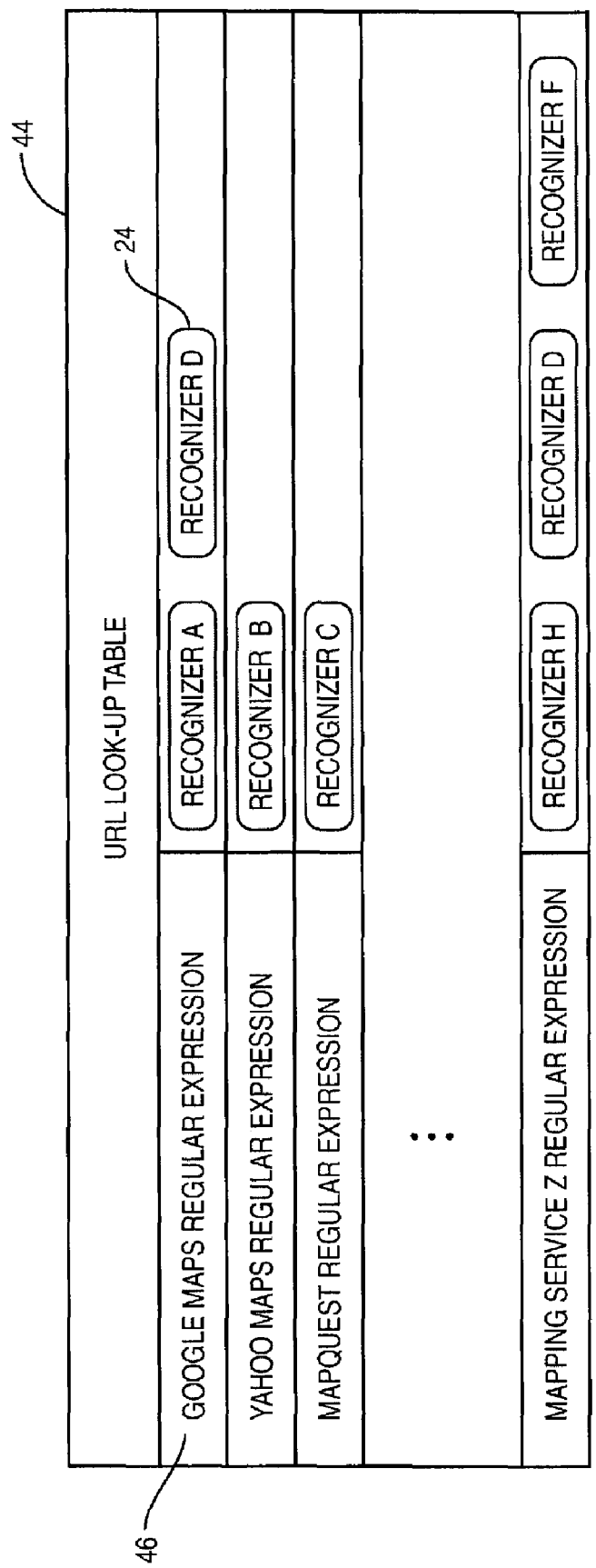
FIG. 4 is a block diagram of a URL look-up table data structure.

FIG. 4 illustrates the URL look-up table 44 that an embodiment of the invention creates as recognizers 24 register with the contact information function 20. The index of the table 44 is a set of regular expressions 46, each of which specifies one or more URLs for a well-known contact information service on the web. Each regular expression 46 may be designed for matching a specific domain name or range of domain names within a URL, for one or more search parameters that signify a search for contact information, and/or subdirectories where contact information resides. In short, the regular expression 46 may be designed to match any elements that a URL may contain.

Each regular expression 46 is associated with one or more links to a recognizer 24. Each recognizer 24 associated with a regular expression 46 is designed to work in the pages specified by the expression. When the user enters or selects a URL that matches a regular expression 46, the contact information function 20 uses each associated recognizer 24 in turn to search through the page(s) returned by the URL for contact information.

Figure 5A:
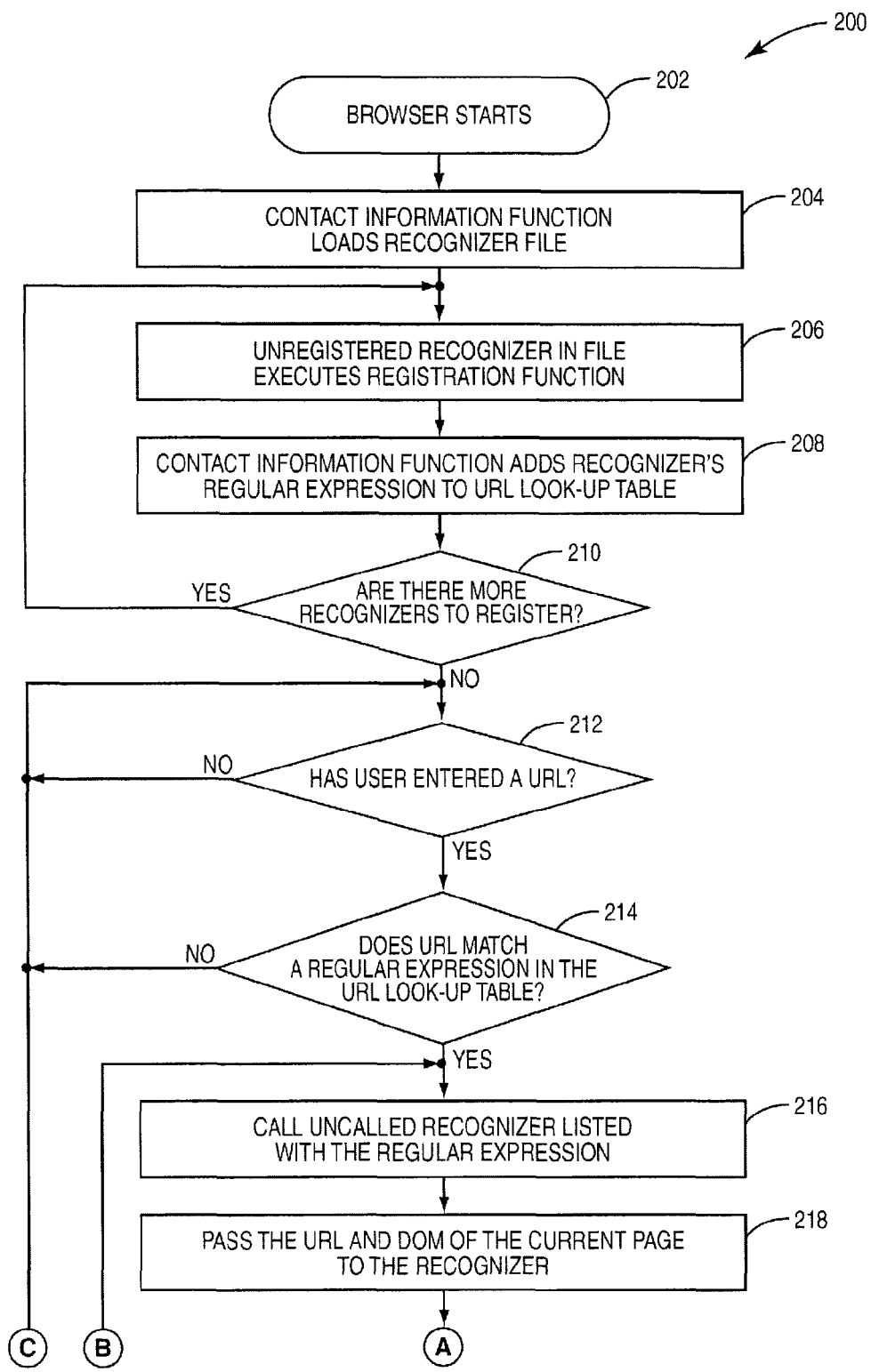
FIG. 5 is a flow diagram of a method of extracting contact information from web sites.
Figure 5B:
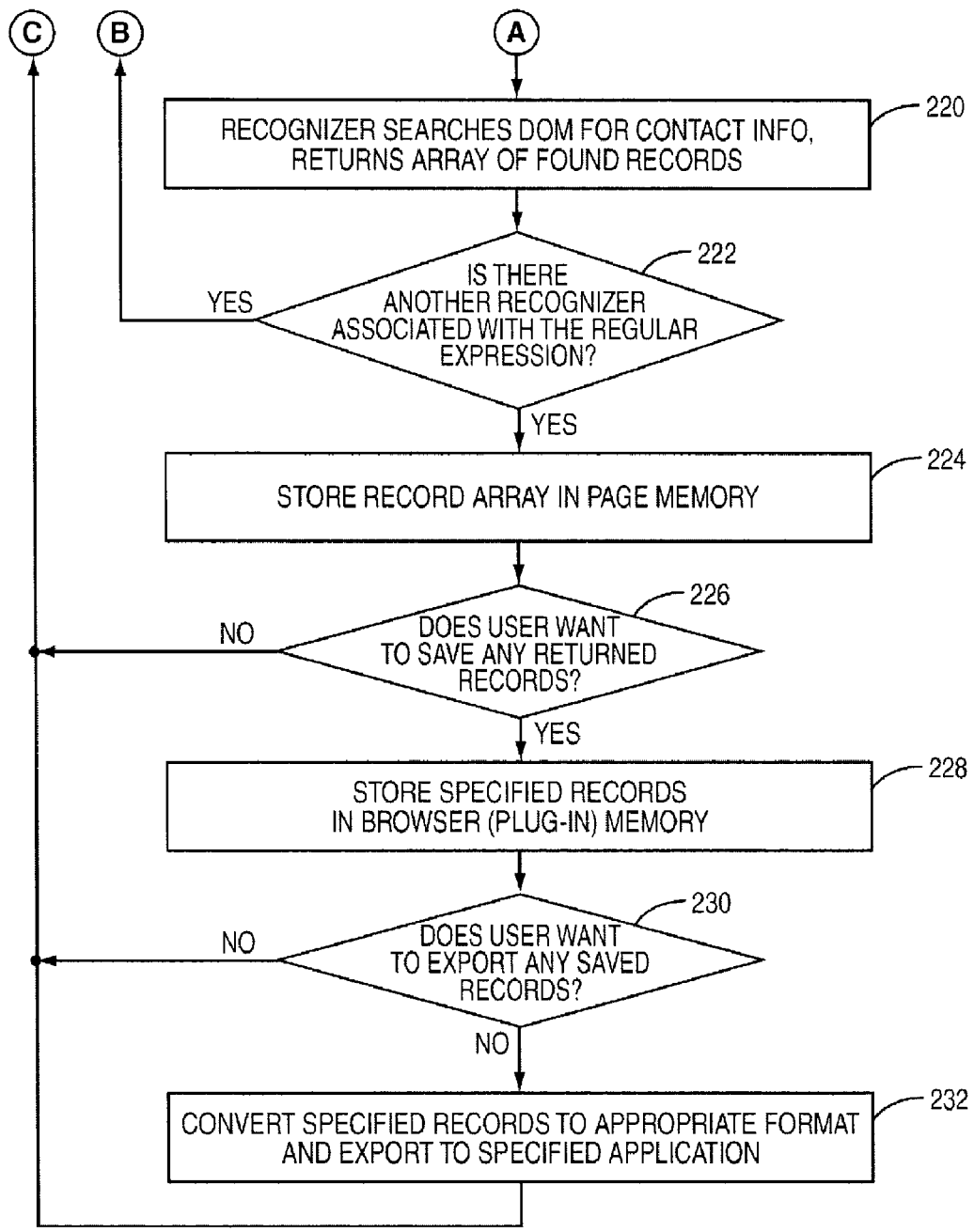

FIG. 5 illustrates a process 100 that occurs when a contact information function 20 looks for contact information in a web page requested by a user. The process begins when the browser 12 starts and the contact information function 20 starts with it (block 102). The contact information function 20 may be embodied in a plug-in that starts with the browser 12, or may be an integral function of the browser 12 itself. The contact information function 20 loads its recognizer file (block 104), which contains an array 22 of available recognizers 24.

With the recognizer array 22 in memory, the contact information function 20 proceeds to execute the registration function 28 of each recognizer object 24 in the array 22. The registration function 28 registers the recognizer 24 with the contact information function 20 and supplies one or more regular expressions 46 that define the URL set within which the recognizer 24 works (block 106). The contact information function 20 creates a URL look-up table 44 into which it adds each regular expression 46 accompanied by the associated recognizer 24 (block 108). If two recognizers 24 supply the same regular expression 46, then the contact information function 20 adds both recognizers 24 to the same table 44 entry under the same regular expression 46. The contact information function 20 continues this process until all recognizer objects 24 in the array 22 have been registered (block 110).

Once the recognizer array 22 has been traversed (block 110), the contact information function 20 monitors the browser 12 for URLs entered or selected by the user (block 112). If the user enters a URL, selects a URL from a list such as a list of favorites or bookmarks, or selects a URL by clicking a link in a displayed web page, the contact information function 20 checks the URL against each entry in the table 44 to see if the URL matches any of the regular expressions 46 defined there. If the contact information function 20 finds a match (block 114), it calls the recognize function 26 of the first recognizer 24 associated with the regular expression 46 (block 116) and passes the URL and the Document Object Model (DOM) returned by the URL to the recognize function 26 (block 118).

The recognizer 24 searches the DOM, which contains the web page contents, for contact information. It returns an array of found contact information records 32, which may be empty if the recognizer 24 found no contact information (block 120).

If there is another recognizer 24 associated with the regular expression 46 (block 122), the contact information function 20 calls its recognize function 26 (block 116) and passes it the same URL and DOM (block 118). If, after searching, the recognizer 24 returns an array of contact information records 32, the contact information function 20 consolidates them with the previously returned records 32 in the contact information array 30. The contact information function 20 stores the array 30 in page memory (block 124). Page memory is memory that is only maintained as long as the current web page displays, and is cleared out when the browser 12 moves to a new web page.

The user may, at any time after the contact information function 20 has stored records 32 in page memory (block 124), request to save one or more of those returned records 32. If so (block 126), the contact information function 20 stores the specified records 32 in memory that persists over multiple web pages as long as the browser is running (block 128). This is memory allocated either the browser 12 or a plug-in, depending on how the contact information function 20 is implemented in a given embodiment. The user may choose to export any of those records 32 to an external application (block 130), at which time the contact information function 20 converts the specified records 32 to an appropriate format for the external application and exports the records (block 132).

The contact information function 20 continues to monitor the browser 12 for new user-entered or user-selected URLs (block 112), and if at any time a new URL is entered or selected, the contact information function 20 once again looks up the new URL in the URL look-up table (blocks 116-120). If an entered or selected URL does not match any regular expression 46 in the URL look-up table 44 (block 114), or if the user chooses not to save any returned contact records 32 (blocks 126, 130), the contact information function 20 returns to monitoring the browser 12 for newly entered or selected URLs (block 112).

Figure 6:
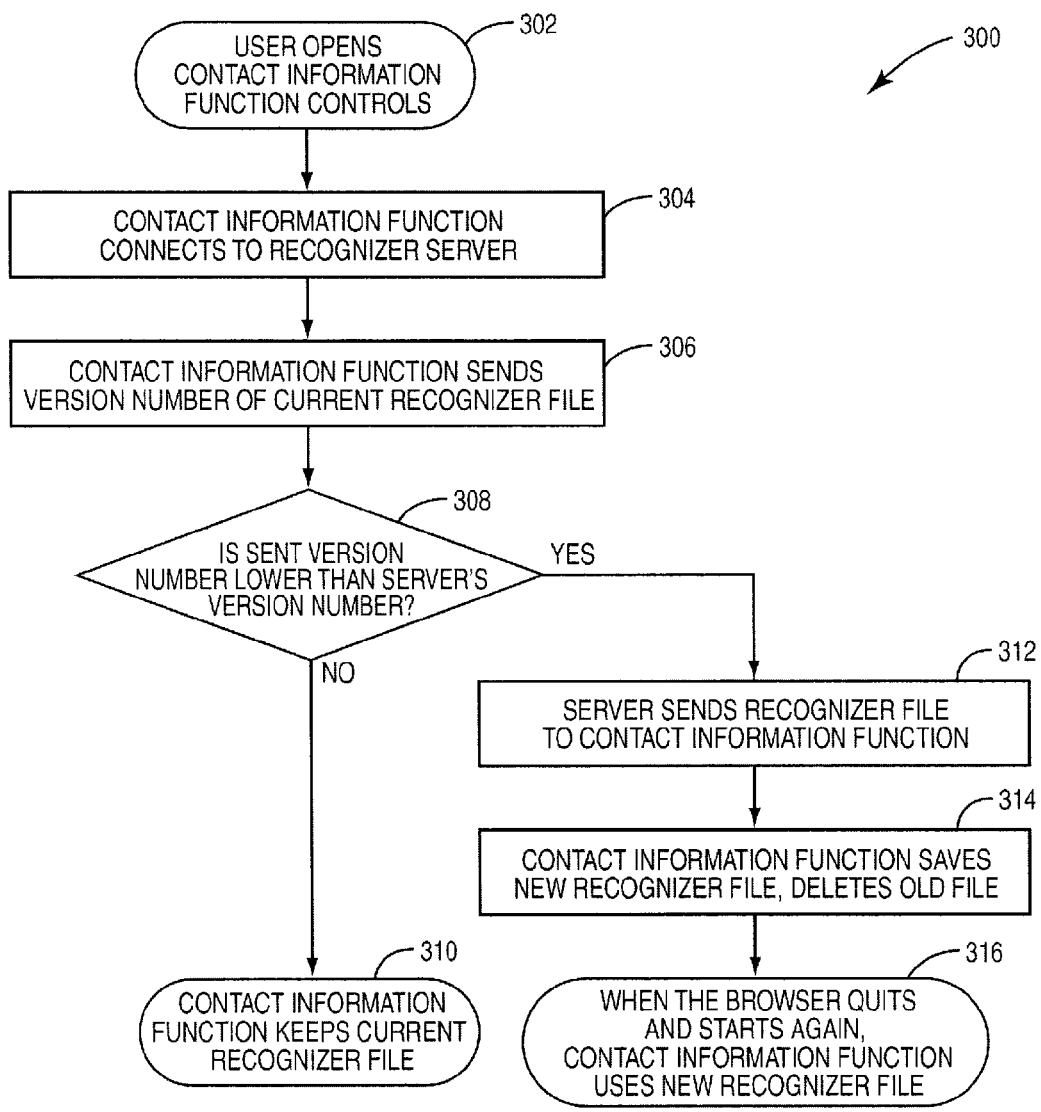
FIG. 6 is a flow diagram of a method of updating a recognizer array.

FIG. 6 illustrates a process 200 that occurs when the contact information function 20 contacts a recognizer server 16 to download new recognizers 24 if appropriate. The process 200 begins, as depicted in FIG. 6, when the user opens the contact information function's 20 controls (block 202). In other embodiments, the process 200 may occur each time the contact information function 20 runs, upon the loading of a predetermined number of URLs, at regular intervals of the calendar, or the like.

The contact information function 20 connects to the recognizer server 16 (block 204) and sends the version number of its current recognizer array 22 file (block 206). The version number is included in the file.

The recognizer server 16 checks the supplied version number against the version number of the latest recognizer array 22 file that it has stored. If the version number shows that the contact information function 20 has an out-of-date recognizer array 22 file, the server 16 sends a copy of the latest recognizer array 22 file to the contact information function 20 (block 212), which saves the new file and deletes the old file (block 214). Otherwise, the contact information function 20 continues to use its current recognizer array 22 file (block 210).

In one embodiment, the contact information function 20 deletes its current URL look-up table 44, and creates a new one by registering the recognizers 24 in the new recognizer array 22 file (block 216), by executing steps 106-110 of the process 100 depicted in FIG. 5. In all embodiments, when the contact information function 20 restarts, it loads the new recognizer array 22 file and registers each recognizer 24 in the array (block 218).

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

Figure 7:
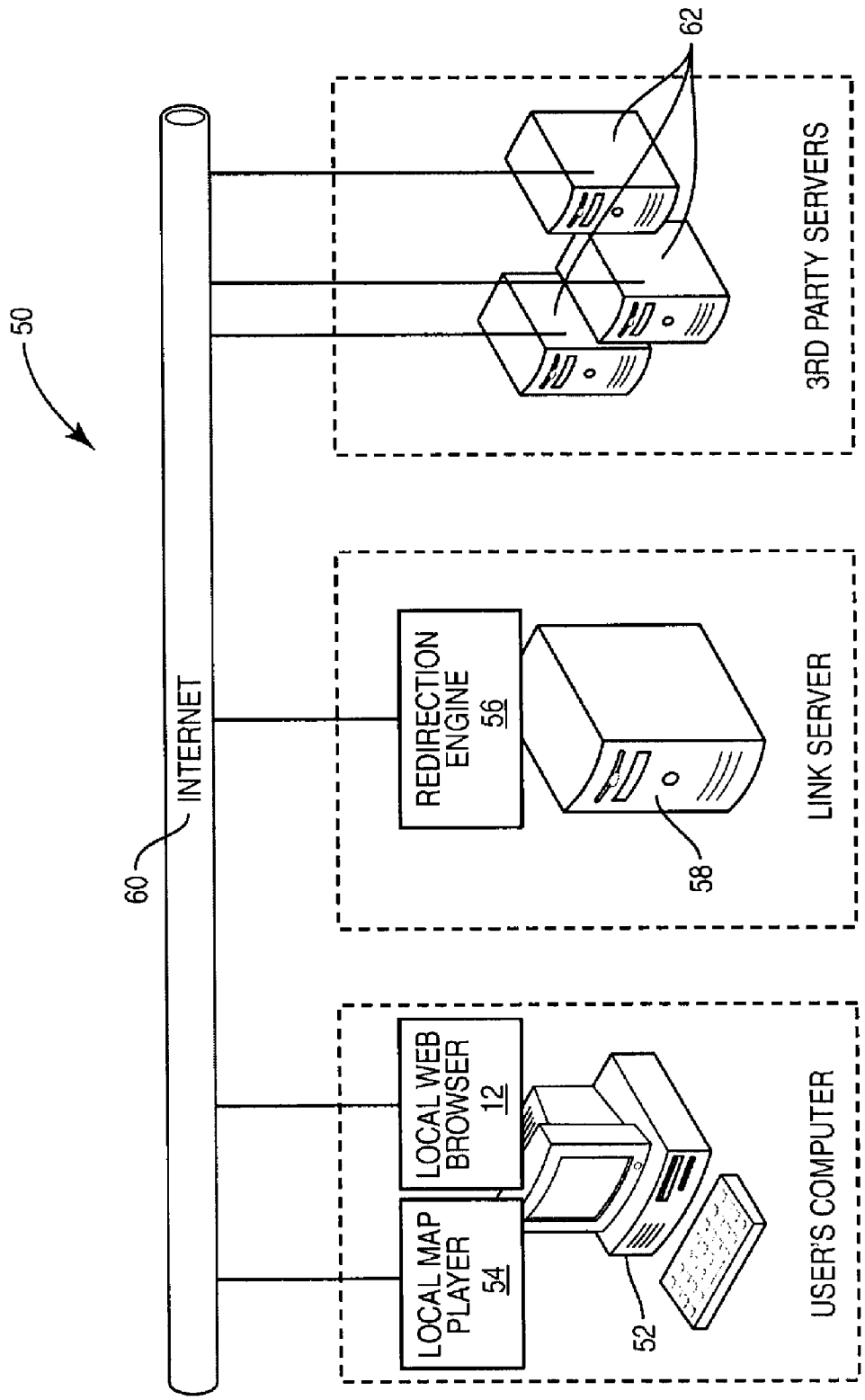
FIG. 7 is a functional block diagram of a computer connected to a link server and 3$^{rd}$-party servers.

FIG. 7 illustrates the components of a system 50 for redirecting URLs to obtain the most updated information. A user's computer 52 runs a local map player 54, which is a client-side interactive map that stores its map data on the user's computer for fast map access. The user's computer also runs a local web browser 12. In one embodiment, the local map player 54 is implemented as a plug-in to the web browser 12. In another embodiment, the local map player 54 is a separate application. In still another embodiment, the local map player 54 functionality is integrated into the web browser 12.

A redirection engine 56 runs on a link server 58, which is available over the Internet 60 to all local map players 54 designed to run using an embodiment of the invention. The redirection engine 56 receives connections from local web browsers 12 that use URLs created by local map players 54. The redirection engine 58 interprets the information in an incoming URL, creates a new outgoing URL, and uses the new URL to connect to any one of a number of $3^{rd}$ party servers 62 available over the Internet 60. The outgoing URL specifies information that the $3^{rd}$-party server 62 should return to the requesting local web browser 12.

Figure 8:
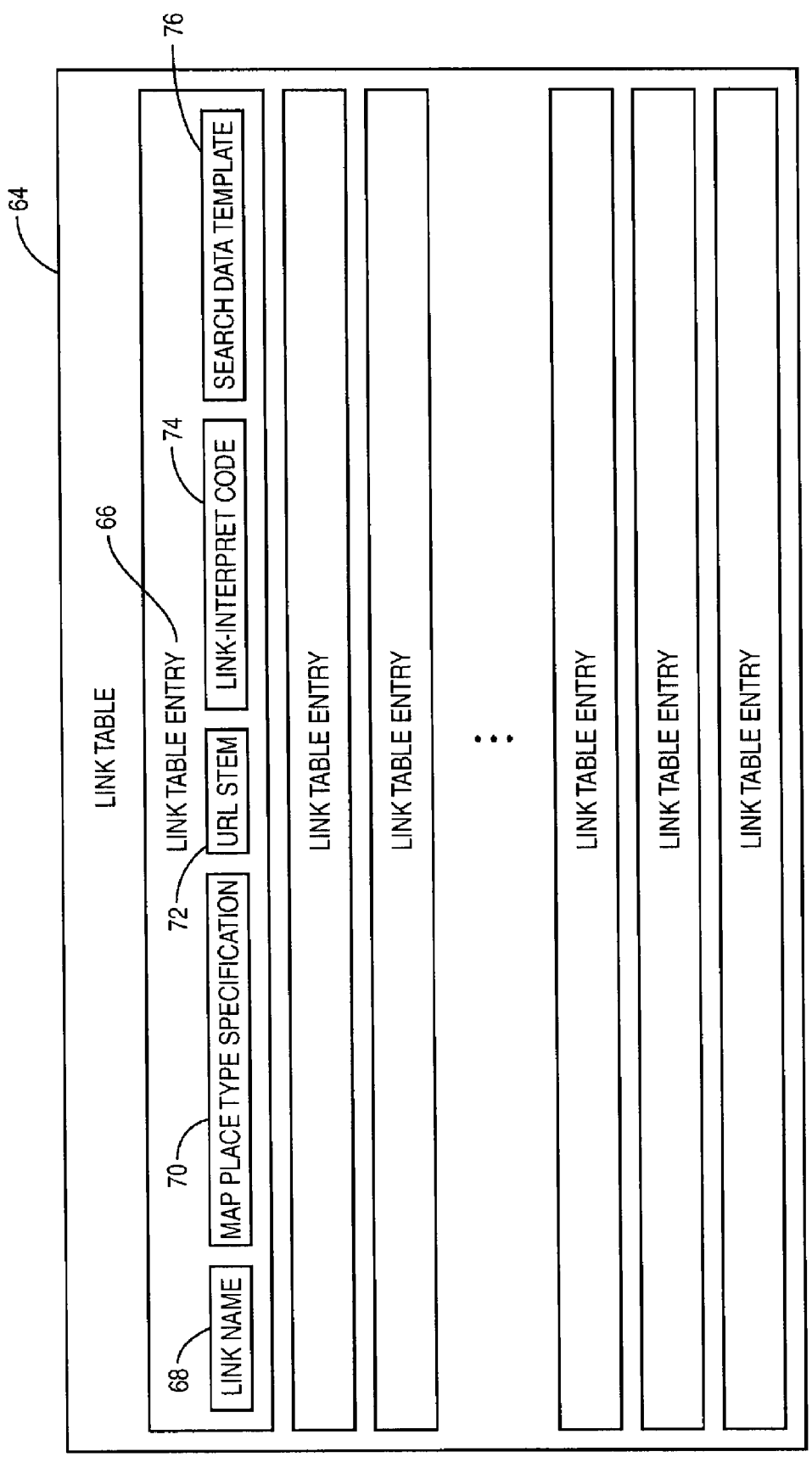
FIG. 8 is a block diagram of a link table data structure.

FIG. 8 illustrates a link table 64 used by the local map player in an embodiment of the invention to define possible types of links that can appear to a user for information about a selected place within a map. Each link table entry 66 contains a set of elements that define the link type.

The link name 68 is the text that appears in the map player 54 when the link is presented to the user. The map place type specification 70 is an element that defines which place types this link may appear for. It may, for example, define that a reservations link type only be used to create links for hotel places and restaurant places. The URL stem 72 defines the first part of the URL this link type uses to connect to the redirection engine 56. It can define the protocol, computer host, port, and path used for the connection. An example of a URL stem that may be defined here is "http://www.acme-.com:50/geoserver".

The link-interpret code 74 is an alphanumeric code value that specifies how the redirection engine 56 that this URL connects to should interpret the information contained in the URL. The search data template 76 defines how data about the currently selected place should be included in the URL in the URL tail that follows the URL stem.

The local map player 54 uses two different link tables 64 when the user is viewing a map: the general link table and the map link table. The general link table 64 defines link types that may appear in all maps. The map link table 64 defines link types that appear only in the map the user is currently viewing. The entries in each table 64 contain the same elements.

Figure 9:
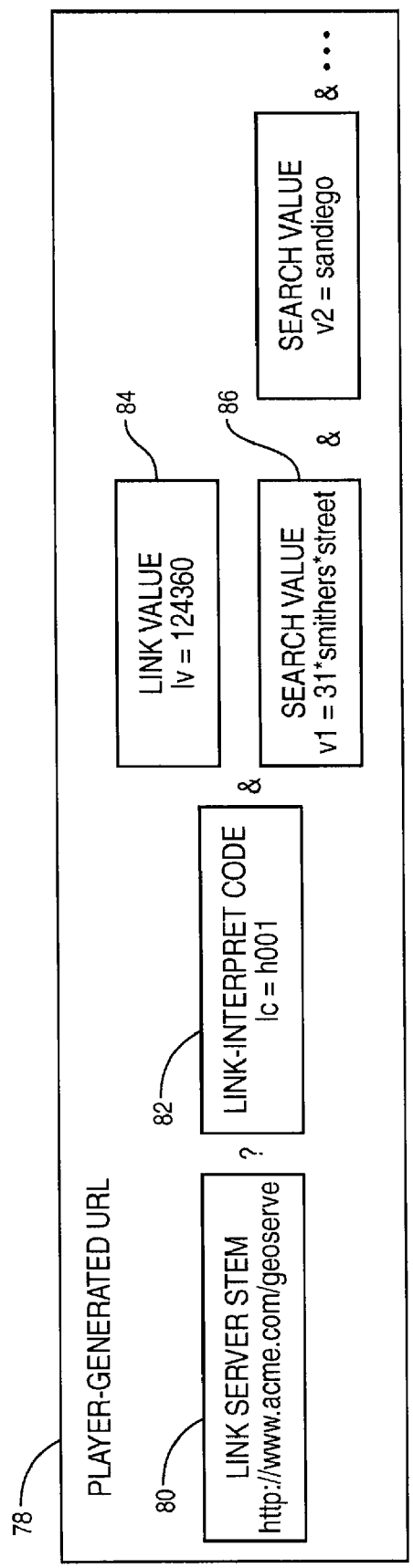
FIG. 9 is a block diagram of a player-generated URL.

FIG. 9 illustrates the player-generated URL 78 that the local map player 54 in one embodiment of the invention creates for a link presented to a user viewing a place on a map. It contains a set of elements that define a server 58 to connect to along with data that the redirection engine 56 at the server 58 will read to learn how to reshape this URL 78. The figure uses an example URL to illustrate the parts. Because the last elements of the player-generated URL 78 can be either of two alternate sets of elements, FIG. 9 displays one alternative above the other alternative.

The beginning of the URL 78 is the link server stem 80. It defines the protocol and host machine the link should connect to and may optionally define the port number and path used for the connection. It is followed by a question mark (defined by URL protocol) that separates the URL stem 80 from search values following. This element specifies a connection to the redirection engine 56.

The second element is the link-interpret code 82, an alphanumeric value that corresponds to the link-interpret code 74 used in the link table 64 that defines this link. It defines how the redirection engine 56 will interpret the information in this URL 78. It is followed by an ampersand (defined by URL protocol) that separates search data items from each other in a URL 78.

The third element may either be a link value 84 or a set of one or more search values 86, depending on how the link-interpret code 74 specifies that this URL 78 should be interpreted by the redirection engine 56. The link value 84 is a single variable, lv, that specifies a replacement URL tail stored by the redirection engine 56. The set of search values 86 comprises one or more values that provide place-specific data used to find information about the place. The redirection engine 56 extracts these values and formats them into a new URL to send to a $3^{rd}$-party server 62.

The full sample URL 78 for the top alternative is: "http://www.acme.com/geoserve?lc=h001&lv=124360". This supplies the link value 84 of "124360" that the redirection engine 56 will use to find a replacement search value in a table maintained by the redirection engine 56.

The full sample URL for the bottom alternative is http://www.acme.com/geoserve?lc=v001&v1=31*smithers*street&v2=sandiego". This supplies a set of values 86 used to search for place information—in this case, a street address and city name.

FIG. 9 depicts a single link-interpret code 82 for clarity. In practice, because the link-interpret code 82 specifies how the redirection engine 56 interprets the URL 78, a URL 78 with a link value 84 would have one link-interpret code 82 while a URL 78 with a set of search values 86 would have a different link-interpret code 82.

Figure 10:
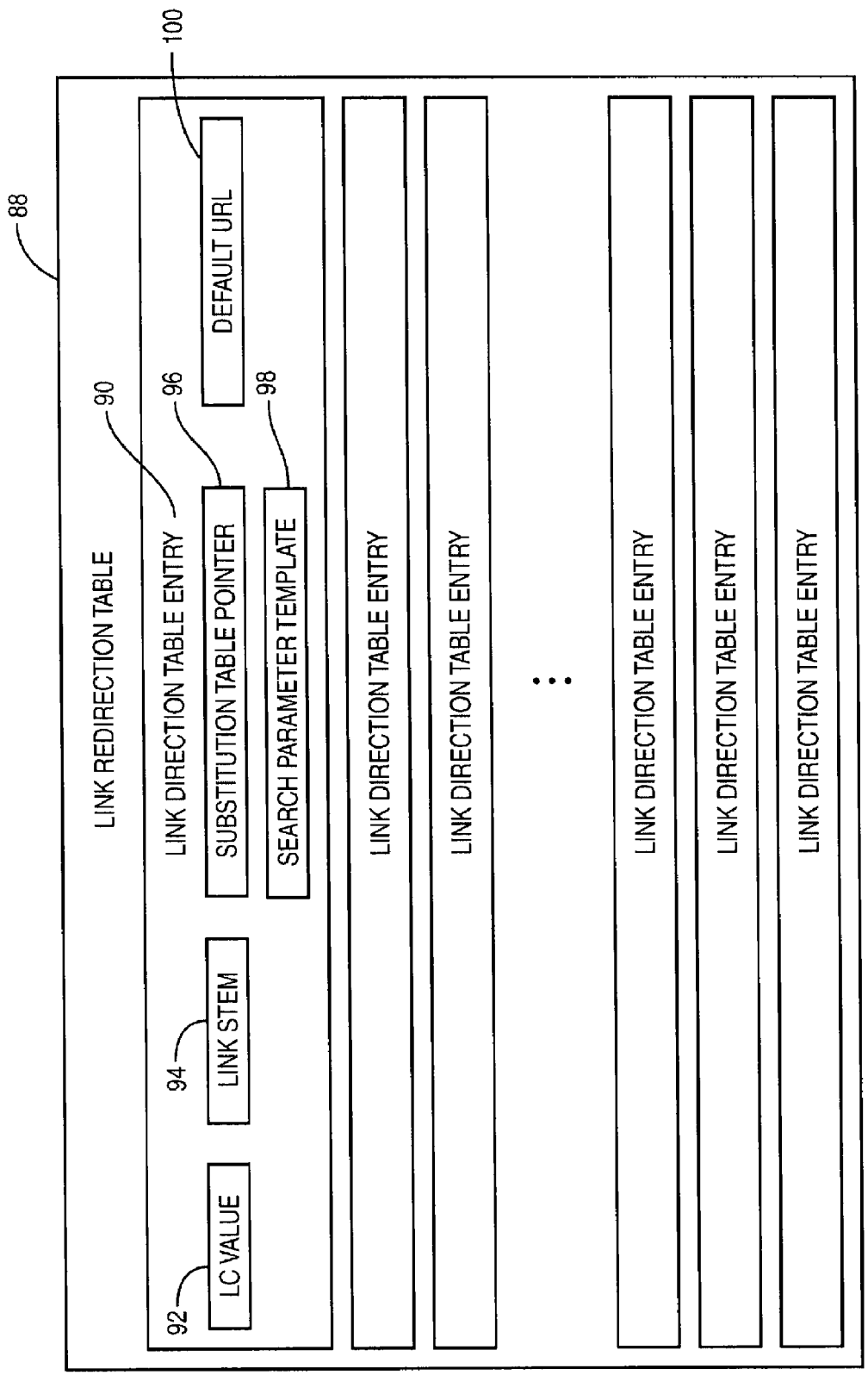
FIG. 10 is a block diagram of a link redirection table data structure.

FIG. 10 illustrates a link redirection table 88 maintained by the redirection engine 56 in one embodiment of the invention. The redirection engine 56 uses the table 88 to interpret link-interpret code 82 values in the URLs 78 of incoming connections. Each link direction table entry 90 contains four elements. The third element may be either of two types depending on whether the incoming URL's 78 link-interpret code 82 specifies search item substitution or search item reformatting.

The first element in the table is the LC value 92, which is the table key. It is a link-interpret code 82 value that the incoming URL 78 supplies. The link redirection table 88 contains one entry for each possible LC value 92.

The second element is a link stem 94. It defines the beginning of the outgoing URL used to connect to a $3^{rd}$-party server 62 and so it specifies the $3^{rd}$-party service to use for this information request.

In the case that the LC value 92 specifies search item substitution, the third element is a substitution table pointer 96 that points to a substitution table maintained by the redirection engine 56. In the case that the LC value 92 specifies search item reformatting, the third element is a search parameter template 98 that defines how search values 86 are reformatted for the outgoing URL.

The fourth element is a default URL 100 that the redirection engine 56 uses if it is unable to successfully reshape the incoming URL 78 or if there are problems connecting to the $3^{rd}$-party server 62.

Figure 11:
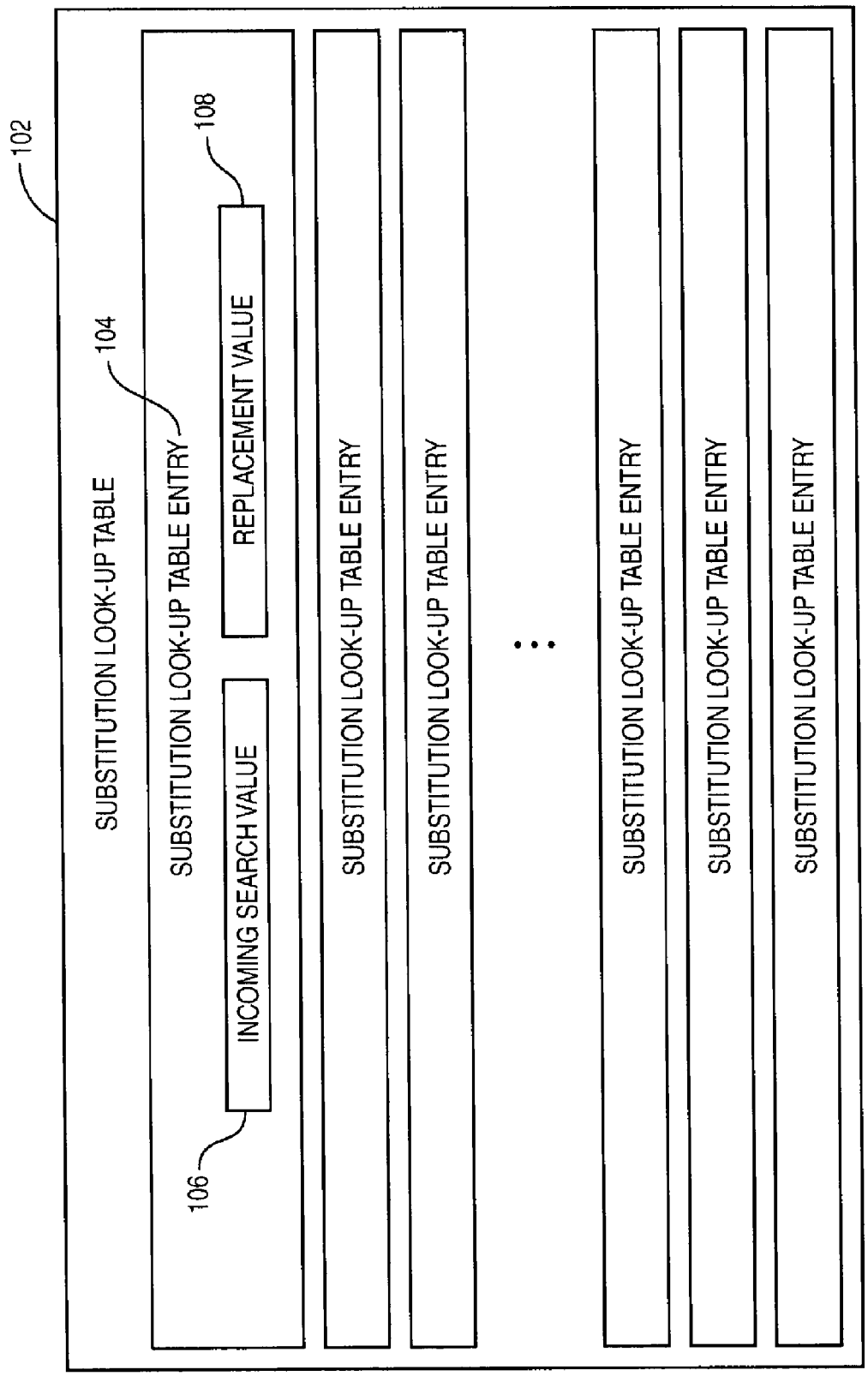
FIG. 11 is a block diagram of a substitution look-up table data structure.

FIG. 11 illustrates a substitution lookup table 102 used by one embodiment of the invention. The redirection engine 56 may store one or more of these tables 102. The substitution table pointer element 96 of entries in the link redirection table 88 points to each of these tables 102. Substitution lookup table entries 104 are simple key/value pairs. The key, the incoming search value 106, corresponds to a link value 84 that an incoming URL 78 supplies. The associated value is the replacement value 108, a URL tail that the redirection engine 56 appends to the link stem 94 to form the outgoing URL to supply search values 86 for a $3^{rd}$-party service. As an example, the incoming search value 86 may be 124360, which is associated with a replacement value 108 of "hotel=2480" that specifies a hotel within a reservation service.

Figure 12:
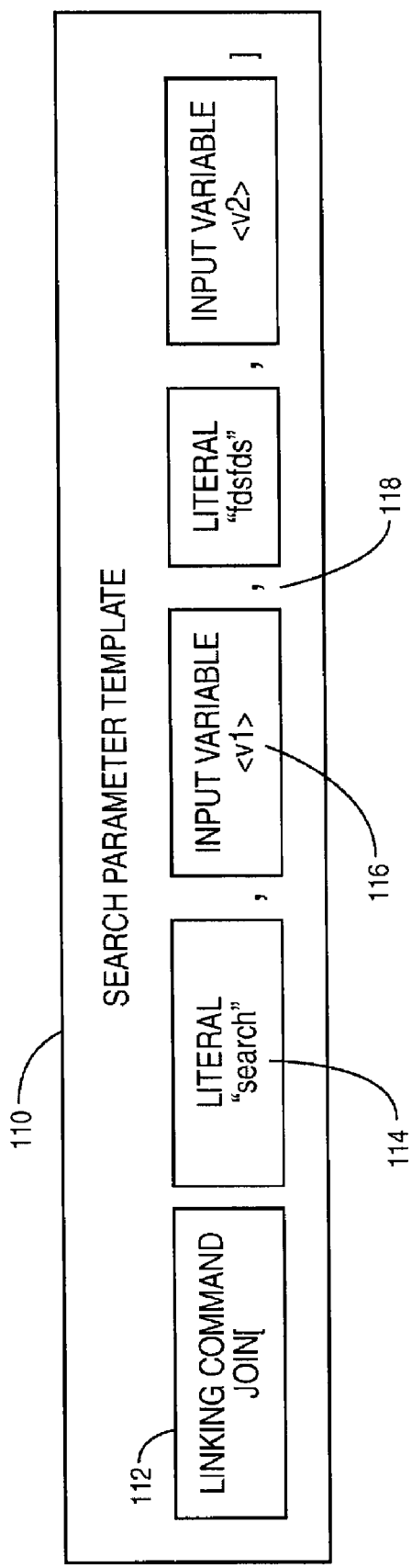
FIG. 12 is a block diagram of a search parameter template.

FIG. 12 illustrates a search parameter template 110 that may be contained in a redirection table entry 90 in one embodiment of the invention. It starts with a linking command 112 that tells the redirection engine 56 to add this to the URL stem 94 specified earlier in the link redirection table entry 90. It is followed by a set of one or more literals 114, input variables 116, and separation characters 118 (in this case a comma) all enclosed in square brackets. Each literal 114 is a string of characters enclosed in quotation marks that is to be inserted verbatim into the URL tail. Each input variable 116 corresponds to a search value 86 in the incoming URL 78. The redirection engine 56 substitutes an incoming search value 86 for each input variable 116 here.

Figure 13:
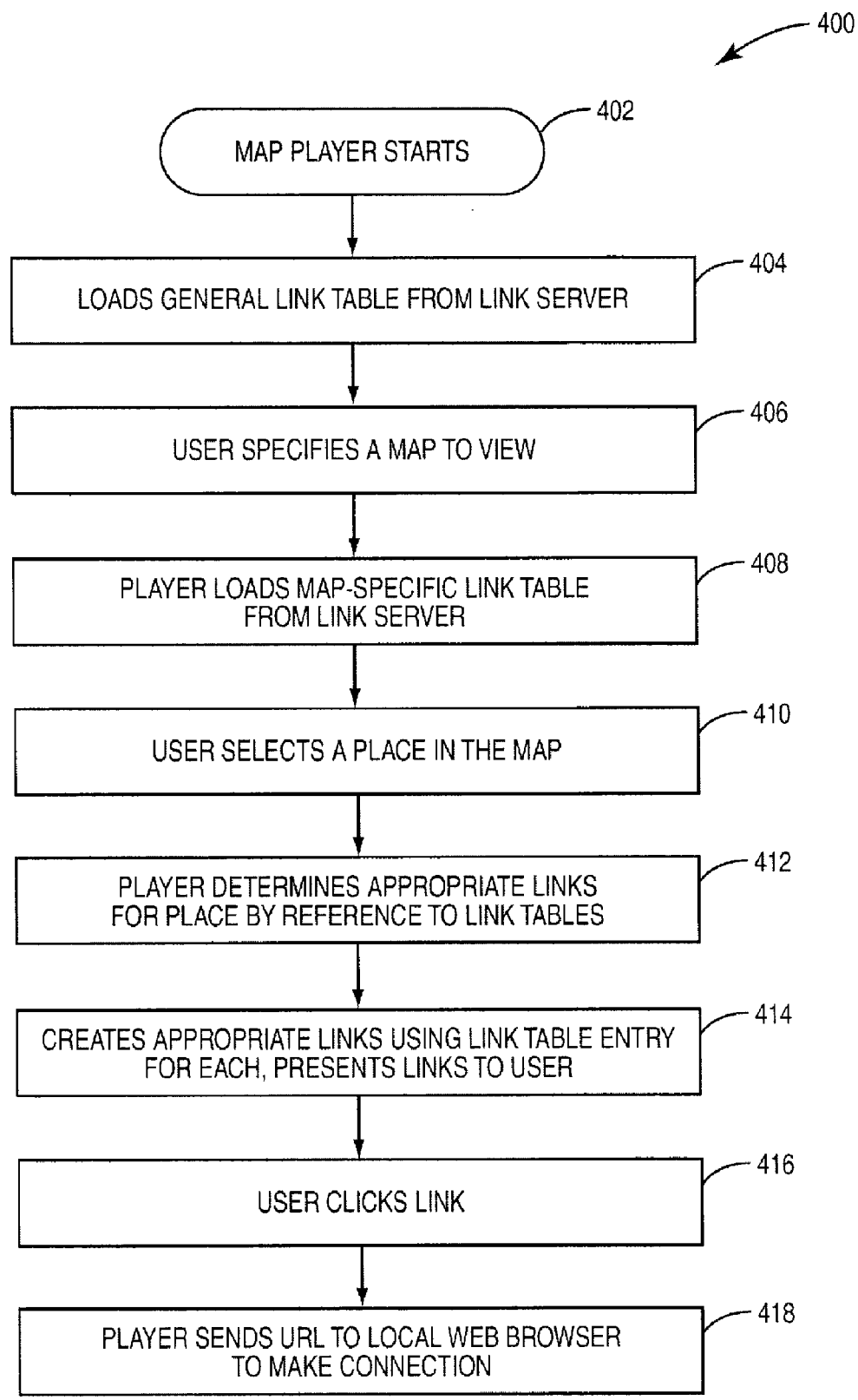
FIG. 13 is a flow diagram of a method of presenting links in a map display.

FIG. 13 illustrates the algorithm 400 the local map player 54 uses in one embodiment of the invention when user loads and views a map, selects a place, and then selects a link for more information about that place. It begins when the map player 54 starts (block 402). The map player 54 may be implemented as an independent application, as a web browser 12 plug-in, or its functionality may be integrated into a web browser 12. On start-up, the player 54 contacts the link server 58 and downloads the most recent version of the general link table 64 (block 404).

When the user specifies a map to view (block 406)—a city, for example—the player 54 contacts the link server 58 and downloads the map link table 64 for that map (block 408).

When the user selects a place in the map (block 410), the player 54 looks at both the general link table 64 and the map link table 64 to find link types that are defined for this type of place (block 412). If, for example, the user selects a hotel, the player might find that driving directions, photos, reviews, and reservations are appropriate links for this type of place. The player 54 then creates a link for each appropriate link type using the definition contained in each link table entry 66 and presents the links to the user (block 414).

When the user clicks a link (block 416), the player 54 creates a URL 78 according to the link table entry 66 that defines the link. The URL 78 contains a stem 72 that points to the redirection engine 56 on the link server 58 and a tail that contains instructions and search information for the redirection engine 56 to use. The player 54 passes the URL 78 to the local web browser 12, if implemented as separate entities, to make the connection to the redirection engine 56.

Figure 14:
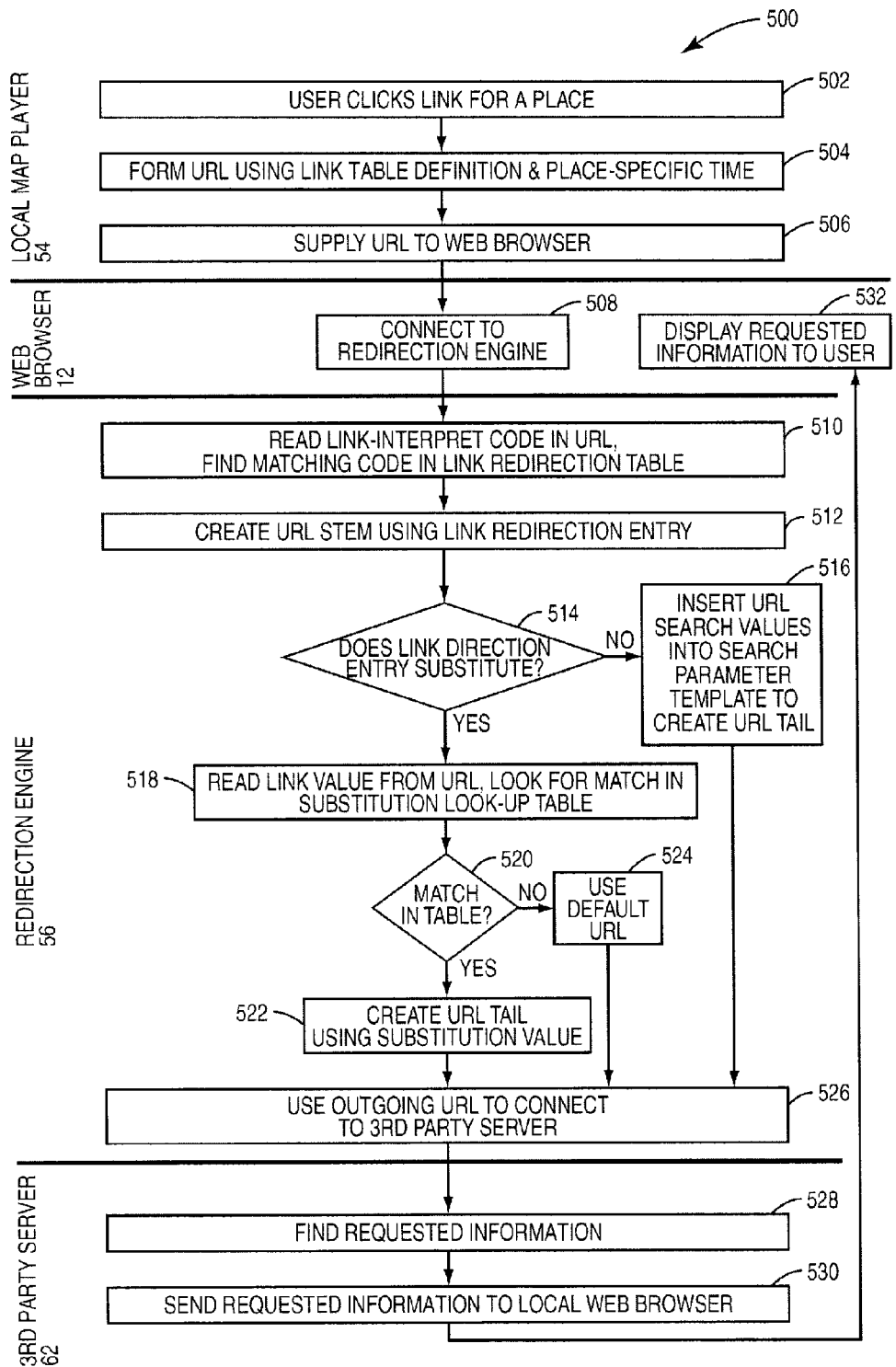
FIG. 14 is a flow diagram of a method of link redirection.

FIG. 14 illustrates the algorithm 500 the local map player 54, local web browser 12 (if separate), and redirection engine 56 use in one embodiment of the invention to redirect a link the user clicks in the map local map player 54 to the appropriate $3^{rd}$-party server 62. When the user clicks a link for a place (block 502), the local map player 54 forms a URL 78 and passes it to the local web browser 12 (block 504).

The browser 12 uses the URL 78 to connect to the redirection engine 56 on the link server 58 (block 508). The redirection engine 56 reads the link-interpret code 82 in the incoming URL 78. It looks in the link redirection table 88 for an entry whose LC value 92 matches the link-interpret code 82 (block 510). It creates a URL stem for the outgoing URL using the stem 72 defined by the link redirection table entry 90.

If the link redirection table entry 90 does not define a substitution table pointer 56 (block 514), the redirection engine 56 reads the search values 86 in the incoming URL 78 and inserts them into the search parameter template 110 defined by the entry 90 to create a URL tail. It appends the tail to the URL stem already created to create an outgoing URL (block 516).

If the link redirection table entry 90 does define a substitution table pointer 96 (block 514), the redirection engine 56 follows the pointer 96 to the substitution table 102. It then looks in the table 102 for a match to the search value 86 in the incoming URL 78 (block 518). If it does not find one (block 520), the engine 56 abandons the URL stem it created earlier and uses the specified default URL for the outgoing URL (block 524). If it finds a match (block 520), it uses the replacement value 108 defined by the matching entry 104 as the URL tail and appends the tail to the URL stem to create the outgoing URL (block 522).

The redirection engine 56 uses the outgoing URL to connect to a $3^{rd}$-party server 62 (block 526). The $3^{rd}$-party server 62 finds the requested information (block 528), which it sends to the local web browser 12 (block 530). The browser 12 displays the requested information to the user who originally requested it (block 532). A contact information function associated with the web browser 12 may then extract contact information from the $3^{rd}$-party web pages, as described above with reference to FIGS. 5A-5B.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

As used herein, contact information is data that specifies an entity such as a person, business, or place along with any of a set of information used to find or contact the entity. Examples of this information include but are not limited to an address, a phone number, and an email address.

As used herein, a recognizer is a programming object employing an algorithm designed to recognize contact information returned by a specific web site or set of related web sites.

As used herein, a redirection engine is a process running on an Internet-accessible server that accepts URL connection requests, interprets them, reshapes the URL accordingly, and sends it to a $3^{rd}$-party server.

As used herein, a URL stem comprises the parts of a URL that specify a connection to a service, typically by defining a format such as HTTP, a host computer, a port available on that computer, and a path to a directory on that computer.

As used herein, a URL tail comprises the parts of a URL following the URL stem that specify the search parameters for a service.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention. The present embodiments are therefore to be construed in all aspects as illustrative and not restrictive and all changes coming within the meaning and equivalency range of the appended claims are intended to be embraced therein.

What is claimed is:

1. A method of extracting contact information from web pages by a contact information function associated with a web browser, comprising:
   processing a recognizer array to create a look-up table, the recognizer array comprising a plurality of recognizer objects, each recognizer object including a recognize function operative to recognize and extract contact information from one or more web sites, and a registration function operative to generate a regular expression specifying a Uniform Resource Locator (URL) of each web site;
   receiving a URL from a user;
   accessing the URL and retrieving a Document Object Model (DOM);
   indexing the look-up table with the URL; and
   processing the DOM by one or more recognizer functions associated with the regular expression specifying the URL, each recognizer function extracting contact information from the DOM and storing the contact information in a predetermined format.

2. The method of claim 1 further comprising downloading an updated recognizer array from a recognizer server.

3. The method of claim 2 wherein downloading an updated recognizer array comprises:
   contacting the recognizer server;
   providing the recognizer server a version of a current recognizer array; and
   selectively downloading an updated recognizer array from a recognizer server if the recognizer server provides a later version of the recognizer array.

4. The method of claim 1 wherein storing the contact information in a predetermined format comprises storing a contact information array comprising one or more contact information records.

5. The method of claim 4 further comprising, in response to user input, formatting contact information from one or more contact information records into a predetermined format, and outputting the formatted contact information.

6. The method of claim 1 wherein the contact information function is implemented as a plug-in to a web browser.

7. The method of claim 1 wherein the contact information function is integrated into a web browser.

8. The method of claim 1, further comprising:
   accepting a link associated with a place on an interactive map;
   generating a redirection URL, the redirection URL including a stem identifying a redirection server and a tail containing information allowing the redirection server to generate a redirected URL identifying a $3^{rd}$-party information server;
   accessing the redirection URL; and
   receiving a DOM from the $3^{rd}$-party information server.

9. The method of claim 8 wherein the tail comprises a link value identifying a substitution tail at the redirection server.

10. The method of claim 8 wherein the tail comprises one or more search values related to a location on the map.

11. A computer readable storage medium including one or more computer programs operative to cause a computer to display an interactive map, the computer programs causing the computer to perform the steps of processing a recognizer array to create a look-up table, the recognizer array comprising a plurality of recognizer objects, each recognizer object including a recognize function operative to recognize and extract contact information from one or more web sites, and a registration function operative to generate a regular expression specifying a Uniform Resource Locator (URL) of each web site;

receiving a URL from a user;

accessing the URL and retrieving a Document Object Model (DOM);

indexing the look-up table with the URL; and processing the DOM by one or more recognizer functions associated with the regular expression specifying the URL, each recognizer function extracting contact information from the DOM and storing the contact information in a predetermined format.

12. The computer readable storage medium of claim 11 wherein the computer programs further cause the computer to create the look-up table by processing a recognizer array comprising a plurality of recognizer objects, each recognizer object including a recognize function operative to extract contact information from one or more web sites, and a registration function operative to generate a regular expression specifying the URLs of the web sites.

13. The computer readable storage medium of claim 12 wherein the computer programs further cause the computer to download an updated recognizer array from a recognizer server.

14. The computer readable storage medium of claim 13 wherein to download an updated recognizer array, the computer programs further cause the computer to contact the recognizer server;

provide the recognizer server a version of a current recognizer array; and selectively download an updated recognizer array from a recognizer server if the recognizer server provides a later version of the recognizer array.

15. The computer readable storage medium of claim 11 wherein storing the contact information in a predetermined format comprises storing a contact information array comprising one or more contact information records.

16. The computer readable storage medium of claim 15 wherein the computer programs further cause the computer to, in response to user input, format contact information from one or more contact information records into a predetermined format, and output the formatted contact information.

17. The computer readable storage medium of claim 11, wherein the computer programs further cause the computer to perform the steps of:

accepting a link associated with a place on an interactive map;

generating a redirection URL, the redirection URL including a stem identifying a redirection server and a tail containing information allowing the redirection server to generate a redirected URL identifying a $3^{rd}$-party information server;

accessing the redirection URL; and receiving a DOM from the $3^{rd}$-party information server.

* * * * *